(12) United States Patent
Olsen et al.

(10) Patent No.: US 6,897,578 B1
(45) Date of Patent: May 24, 2005

(54) INTEGRATED MICROTURBINE GEARBOX GENERATOR ASSEMBLY

(75) Inventors: Andrew J. Olsen, Amesbury, MA (US); Malcolm S. Child, South Berwick, ME (US); Ernest J. Sandoe, Ft. Myers, FL (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 0 days.

(21) Appl. No.: 10/730,156

(22) Filed: Dec. 8, 2003

(51) Int. Cl.⁷ ............................................... F02C 6/00
(52) U.S. Cl. ........................................ 290/52; 310/99
(58) Field of Search .......................... 290/52; 310/99; 475/255

(56) References Cited

U.S. PATENT DOCUMENTS

| | | | | |
|---|---|---|---|---|
| 4,043,146 A | * | 8/1977 | Stegherr et al. | ............. 464/177 |
| 4,075,910 A | * | 2/1978 | Davis et al. | ................. 475/265 |
| 4,086,759 A | * | 5/1978 | Karstensen et al. | ......... 60/39.08 |
| 4,105,372 A | * | 8/1978 | Mishina et al. | .............. 417/243 |
| 4,307,629 A | * | 12/1981 | Moller | ......................... 475/255 |
| 4,649,307 A | * | 3/1987 | Bech | ............................ 310/99 |
| 5,261,289 A | * | 11/1993 | Birch et al. | ............... 74/421 A |
| 5,526,640 A | * | 6/1996 | Brooks et al. | ................. 60/804 |
| 5,553,448 A | | 9/1996 | Farrell et al. | |
| 6,073,857 A | * | 6/2000 | Gordon et al. | .............. 237/12.1 |
| 6,170,251 B1 | | 1/2001 | Skowronski et al. | |
| 6,198,174 B1 | | 3/2001 | Nims et al. | |
| 6,294,842 B1 | | 9/2001 | Skowronski | |
| 6,307,278 B1 | | 10/2001 | Nims et al. | |
| 6,324,828 B1 | | 12/2001 | Willis et al. | |
| 6,352,385 B1 | * | 3/2002 | Wojciechowski et al. | ... 403/404 |
| 6,363,706 B1 | | 4/2002 | Meister et al. | |
| 6,516,618 B1 | | 2/2003 | Bock | |
| 6,526,757 B2 | | 3/2003 | Mackay | |
| 6,546,736 B2 | | 4/2003 | Rakhmailov | |
| 6,571,561 B1 | | 6/2003 | Aquino et al. | |

FOREIGN PATENT DOCUMENTS

| | | | | |
|---|---|---|---|---|
| GB | 2078338 A | * | 1/1982 | ............. F16C/3/00 |
| JP | 2003184977 A | * | 7/2003 | ........... F16H/13/08 |
| WO | WO 03078248 A1 | * | 9/2003 | |

* cited by examiner

Primary Examiner—Joseph Waks
(74) Attorney, Agent, or Firm—Michael Best & Friedrich, LLP

(57) ABSTRACT

A microturbine engine comprising a turbine including a first housing and a turbine rotor. The engine also includes a generator having a second housing and a generator rotor. The generator rotor is supported for low-speed rotation by a low-speed bearing. The engine also includes a gearbox having a third housing connected to the first housing and the second housing, a pinion gear, and a low-speed gear connected to the generator rotor and at least partially supported by the low-speed bearing. A shaft is connected to the turbine rotor and the pinion gear and a first high-speed bearing and a second high-speed bearing are positioned to support the turbine rotor and the shaft for high-speed rotation.

41 Claims, 5 Drawing Sheets

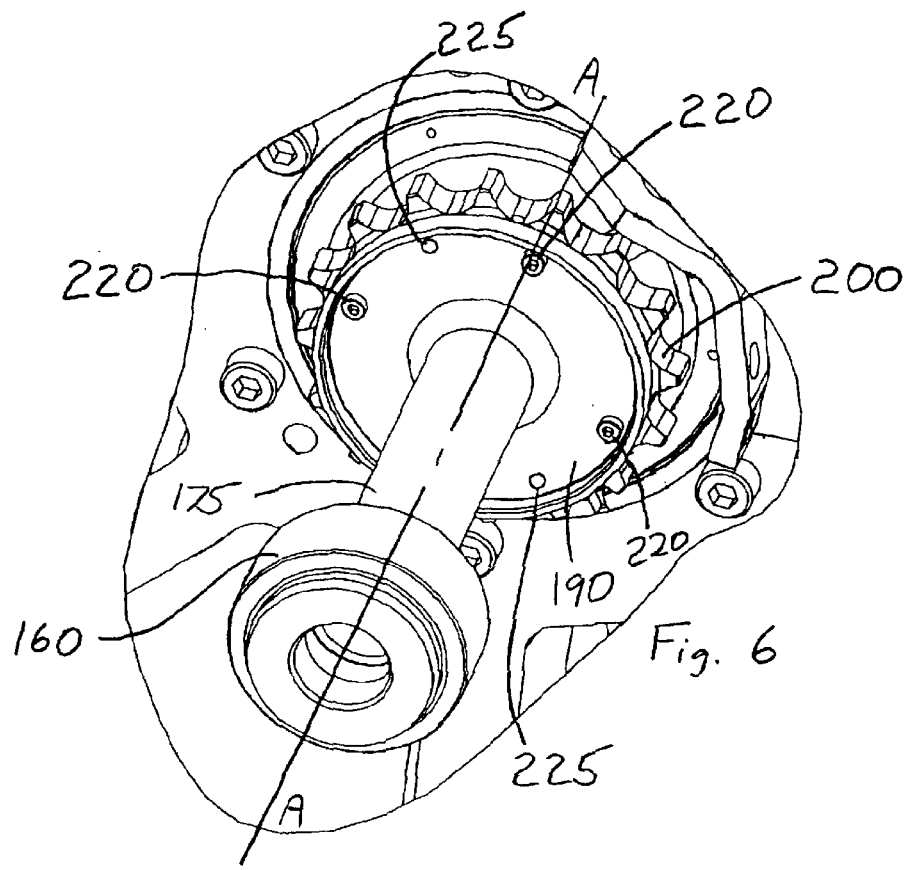
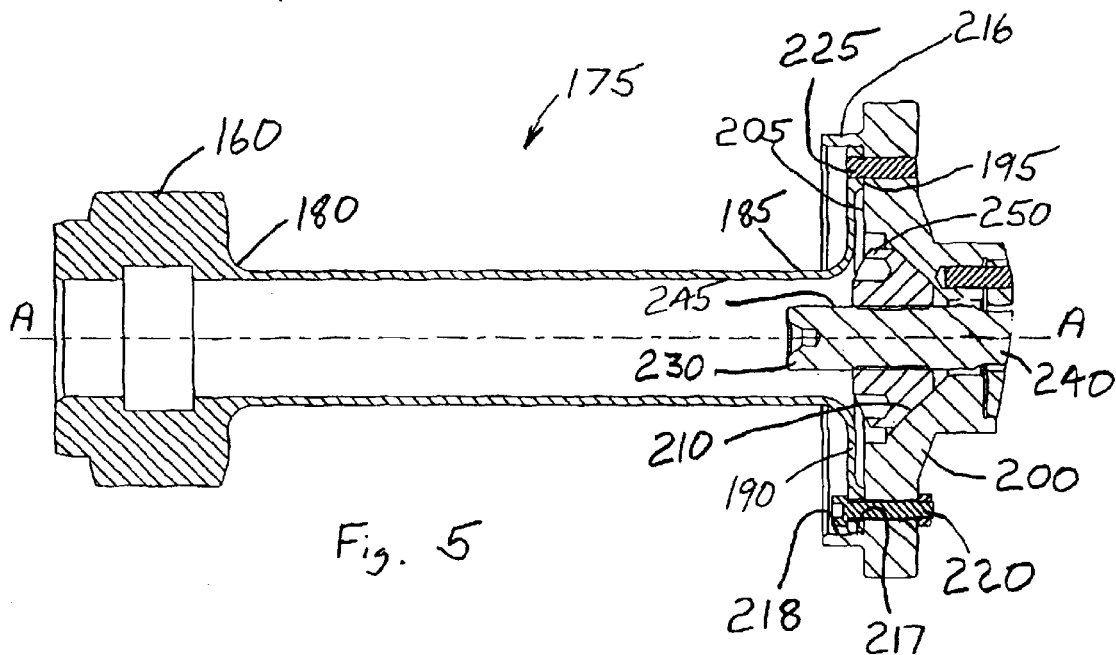

INTEGRATED MICROTURBINE GEARBOX GENERATOR ASSEMBLY

BACKGROUND

The present invention relates to a system and method for driving a low-speed component using a high-speed prime mover. More particularly, the present invention relates to a system and method for driving a low-speed component using a high-speed microturbine.

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MWs may utilize a microturbine engine.

Many microturbine engines include a turbine-compressor assembly that rotates at a high rate of speed. To generate electricity, the turbine-compressor assembly, or a separate turbine, is coupled to the generator, which also rotates at a high rate of speed. The generator output is then conditioned to produce a usable electrical current (e.g., 50 Hz or 60 Hz). In other constructions, a gearbox is positioned between the turbine and the generator to allow the generator to operate at a lower speed. However, due to the high speed of the turbine, the gearbox often requires several high-speed bearings to support the various gears. In addition, the dynamic and mechanical issues associated with the gearbox and turbine (e.g., vibration, imbalance, thrust loading, thermal expansion, and the like) can affect the operation of the other component. For example, a slight imbalance in the gearbox can produce a vibration that is transmitted to the turbine. The high speed of the turbine can act to increase the magnitude or the effect caused by the vibration. This can lead to undesirable operating conditions, system instability, and unwanted engine trips or shutdowns.

SUMMARY

The present invention generally provides a microturbine engine comprising a turbine including a first housing and a turbine rotor. The engine also includes a generator having a second housing and a generator rotor. The generator rotor is supported for low-speed rotation by a low-speed bearing. The engine also includes a gearbox having a third housing connected to the first housing and the second housing, a pinion gear, and a low-speed gear connected to the generator rotor and at least partially supported by the low-speed bearing. A shaft is connected to the turbine rotor and the pinion gear and a first high-speed bearing and a second high-speed bearing are positioned to support the turbine rotor and the shaft for high-speed rotation.

In another aspect, the invention generally provides a microturbine engine including a turbine having a turbine housing and a turbine rotor. The engine also includes a compressor having a compressor housing coupled to the turbine housing and a compressor rotor coupled to the turbine rotor. A rotor flange is coupled to the compressor rotor such that the turbine rotor, the compressor rotor, and the rotor flange at least partially define a rotor train. A first high-speed bearing and a second high-speed bearing are coupled to the rotor train and at least partially support the rotor train for rotation. The first high-speed bearing and the second high-speed bearing are positioned to define a space between the bearings and a space that extends beyond the bearings. At least a portion of the rotor train is positioned within the space beyond the bearings to define a cantilever portion having a free end. The engine also includes a synchronous generator having a generator housing and a generator rotor. The generator rotor is supported for low-speed rotation by at least one low-speed bearing. The engine further includes a gearbox having a gearbox housing connected to the compressor housing and the generator housing. The gearbox includes a ring gear connected to the generator rotor, a plurality of planetary gears, and a pinion gear positioned to engage each of the planetary gears. A quill shaft is coupled to the rotor flange and the pinion gear such that the quill shaft is fully supported by the second high-speed bearing, which is coupled to the rotor flange, and the planetary gears.

In yet another aspect, the present invention generally provides a method of coupling a rotating element of an engine that operates at a first speed to a driven component that operates at a second speed, the second speed slower than the first speed. The method includes coupling a shaft to the rotating element and supporting the rotating element and the shaft with a first high-speed bearing and a second high-speed bearing. The rotating element is supported such that at least a portion of the rotating element is disposed in a space between the bearings and at least a portion of the rotating element is disposed in a space beyond the bearings. The method also includes engaging a second end of the shaft with a plurality of planetary gears and supporting the driven component with at least one low-speed bearing. The method also includes coupling a low-speed gear to the driven component, the low-speed gear coupled to each of the planetary gears.

BRIEF DESCRIPTION OF THE DRAWINGS

The description particularly refers to the accompanying figures in which:

FIG. 5 is an enlarged sectional view of a quill shaft of the microturbine engine of FIG. 1; and FIG. 6 is a perspective view of the quill shaft of FIG. 4.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
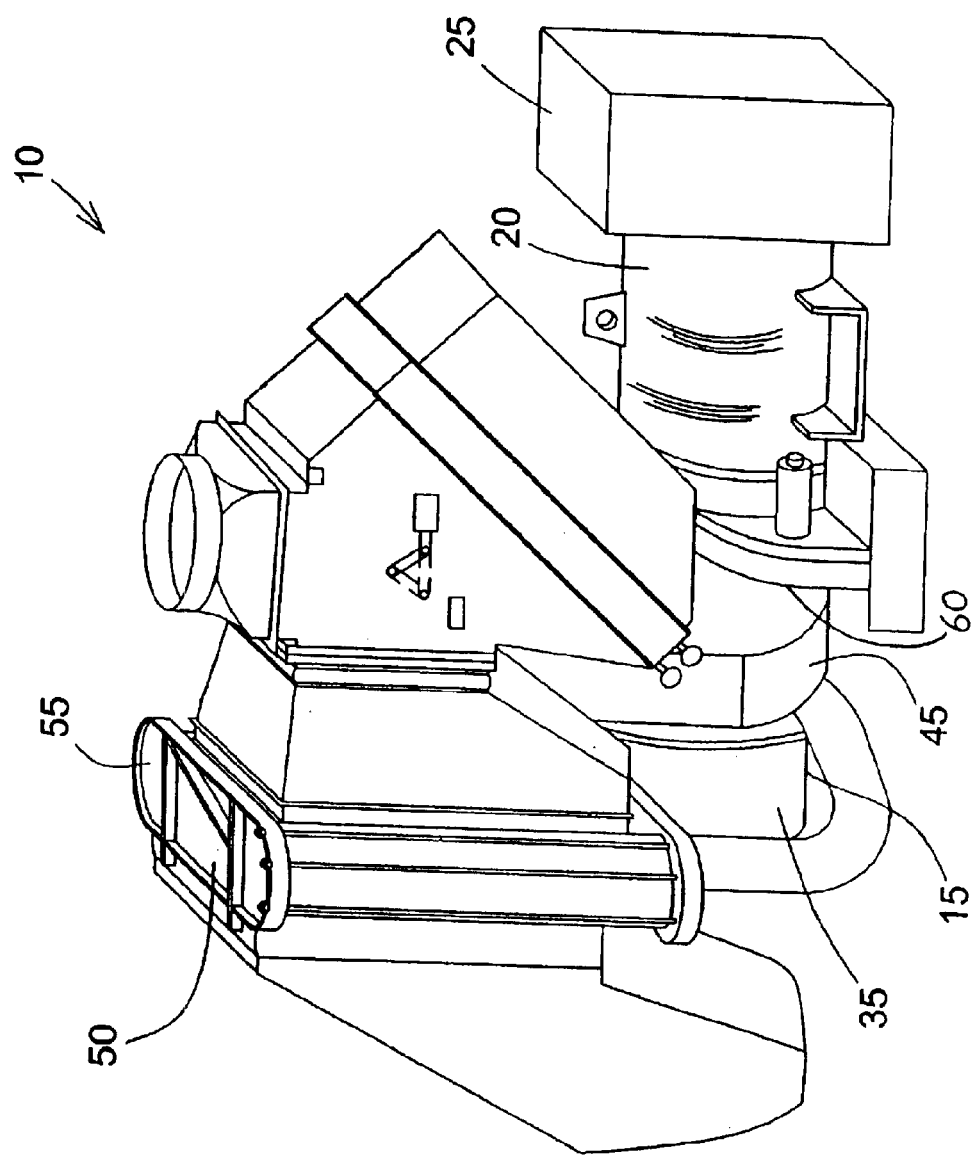
FIG. 1 is a perspective view of a portion of a microturbine engine.

With reference to FIG. 1, a microturbine engine system 10 that includes a turbine section 15, a generator section 20, and a control system 25 is illustrated. The turbine section 15 includes a radial flow turbine 35, a compressor 45, a recuperator 50, and a combustor 55. The recuperator 50 may be of the plate-fin variety with the combustor 55 in the inlet manifold as disclosed in U.S. Pat. No. 5,450,724, the entire contents of which is incorporated herein by reference.

The engine 10 includes a standard Brayton cycle combustion turbine with the recuperator 50 added to improve engine efficiency. The engine shown is a single-spool engine (one set of rotating elements). However, multi-spool engines are also contemplated by the invention. The compressor 45 is a centrifugal-type compressor having a compressor rotor 56 that rotates in response to operation of the turbine 35. The compressor 45 shown is a single-stage compressor. However, multi-stage compressors can be employed where a higher pressure ratio is desired. Alternatively, compressors of different designs (e.g., axial-flow compressors, reciprocating compressors, and the like) can be employed to supply compressed air to the engine.

The turbine 35 is a radial flow single-stage turbine having a turbine rotor 57 directly coupled to the compressor rotor 56. In other constructions, multi-stage turbines or other types of turbines may be employed. The coupled rotors 56, 57 of the turbine 35 and the compressor 45 engage the generator section 20 through a gearbox 60.

The recuperator 50 includes a heat exchanger employed to transfer heat from a hot fluid to the relatively cool compressed air leaving the compressor 45. One suitable recuperator 50 is described in U.S. Pat. No. 5,983,992 fully incorporated herein by reference. The recuperator 50 includes a plurality of heat exchange cells stacked on top of one another to define flow paths therebetween. The cool compressed air flows within the individual cells, while a flow of hot exhaust gas passes between the heat exchange cells.

During operation of the microturbine engine system 10, the compressor rotor 56 rotates in response to rotation of the turbine rotor 57. The compressor 45 draws in atmospheric air and increases its pressure. The high-pressure air exits the air compressor 45 and flows to the recuperator 50.

The flow of compressed air, now preheated within the recuperator 50, flows to the combustor 55 as a flow of preheated air. The preheated air mixes with a supply of fuel within the combustor 55 and is combusted to produce a flow of products of combustion. The use of a recuperator 50 to preheat the air allows for the use of less fuel to reach the desired temperature within the flow of products of combustion, thereby improving engine efficiency.

The flow of products of combustion enters the turbine 35 and transfers thermal and kinetic energy to the turbine 35. The energy transfer results in rotation of the turbine rotor 57 and a drop in the temperature of the products of combustion. The energy transfer allows the turbine 35 to drive both the compressor 45 and the generator 20. The products of combustion exit the turbine 35 as a first exhaust gas flow.

In constructions that employ a second turbine, the first turbine 35 drives only the compressor, while the second turbine drives the generator 20 or any other device to be driven. The second turbine receives the first exhaust flow, rotates in response to the flow of exhaust gas therethrough, and discharges a second exhaust flow.

The first exhaust flow, or second exhaust flow in two turbine engines, enters the flow areas between the heat exchange cells of the recuperator 50 and transfers excess heat energy to the flow of compressed air. The exhaust gas then exits the recuperator 50 and is discharged to the atmosphere, processed, or further used as desired (e.g., cogeneration using a second heat exchanger).

Figure 2:
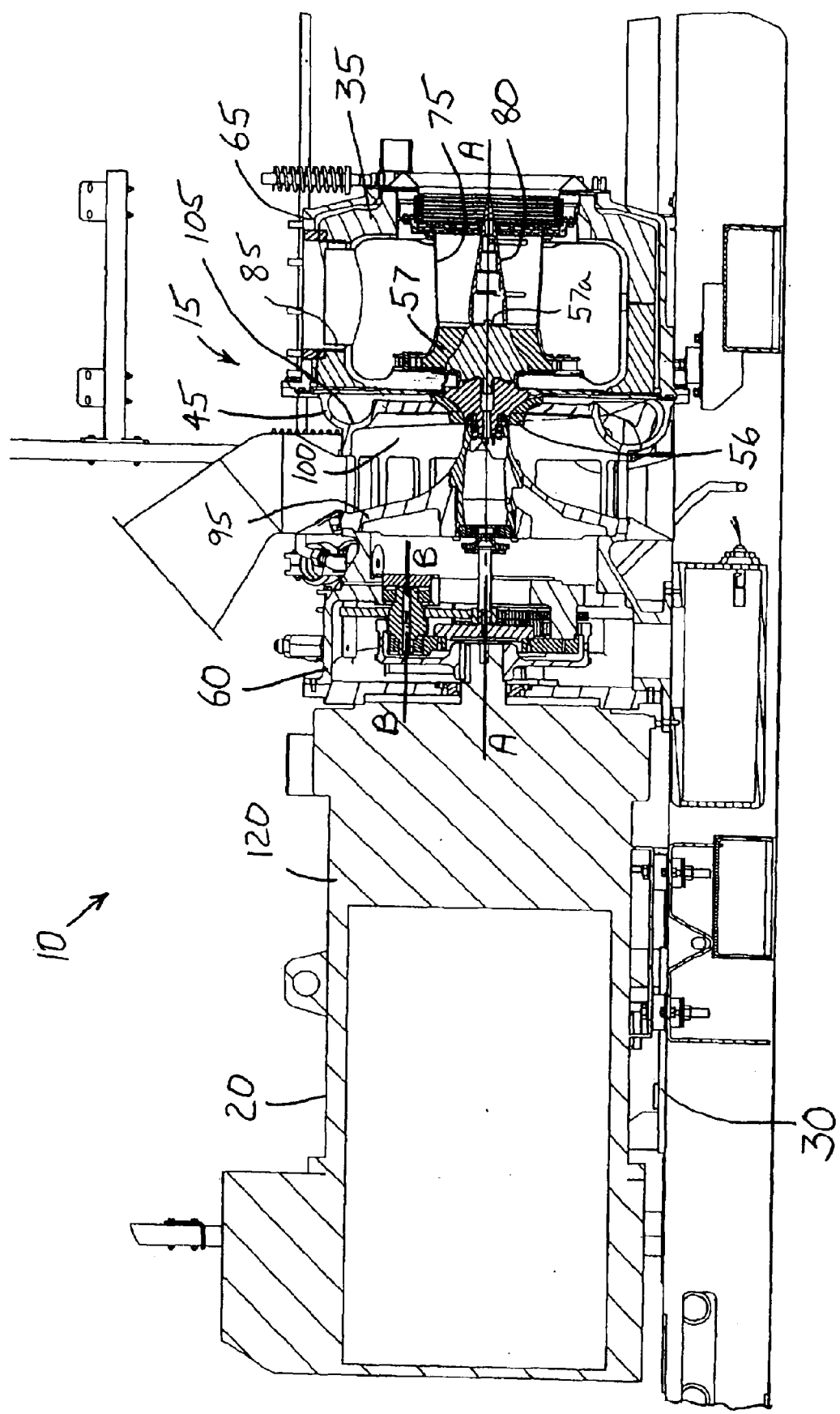
FIG. 2 is a sectional view of the turbine-compressor-generator portion of the engine of FIG. 1.
Figure 3:
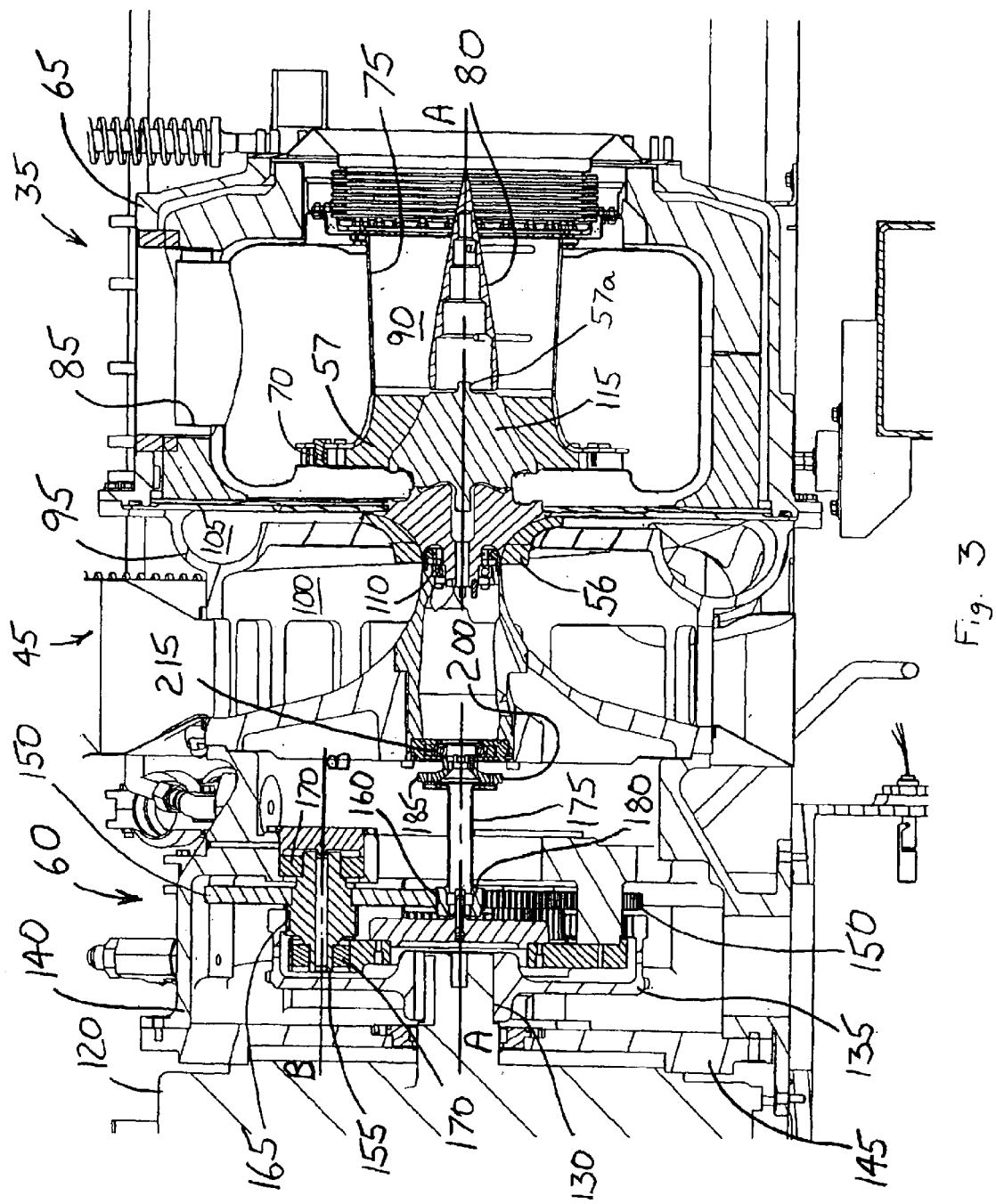
FIG. 3 is an enlarged view of the turbine-compressor and gearbox portion.

Turning to FIGS. 2 and 3, the portion of the engine of FIG. 1 that includes the generator 20, the turbine 35, the compressor 45, and the gearbox 60 is illustrated. The components are arranged and coupled to one another such that the turbine 35, the compressor 45, and the generator 20 rotate on a common axis A—A. In other constructions, the generator 20 may be offset such that it rotates on an axis different from that of the turbine 35 and the compressor 45.

The turbine 35 is located at one end of the engine 10 and includes the turbine rotor 57 and a first, or turbine housing 65. The turbine housing 65 remains stationary and provides support to the turbine rotor 57 as well as the stationary flow elements such as inlet guide vanes 70, a shroud/diffuser cone 75, and a central body 80. The turbine housing 65 includes a scroll 85 that receives the flow of products of combustion from the combustor 55. The shroud/diffuser cone 75 and scroll 85 direct the flow of products of combustion to the inlet guide vanes 70 that then direct the products of combustion into the turbine rotor 57 along the desired path. After passing through the turbine rotor 57, the flow of products of combustion enters a diffuser 90 made up of the diffuser cone 75 and the central body 80. The diffuser walls, defined by the cone 75 and the central body 80, gradually diverge from one another to allow the exhaust gas exiting the turbine 35 to efficiently decelerate the flow as it is discharged from the engine 10. In other constructions another diffuser may be attached to the turbine 35 to further decelerate the flow.

The compressor 45 includes the compressor rotor 56 and a second, or compressor housing 95. The compressor housing 95 is directly connected to the turbine housing 65 to fix the position of the two components 65, 95 relative to one another. The compressor housing 95 includes an inlet plenum 100 that receives atmospheric air for use in the engine 10. The air is drawn in by operation of the compressor 45 and may be filtered before it enters the plenum 100, as it enters the plenum 100, or before it enters the compressor rotor 56. The air enters the compressor 45 in a substantially axial direction (i.e., parallel to the rotational axis A—A of the compressor 45) and exits in a substantially radial direction (i.e., centrifugal). After passing through the compressor rotor 56, the air collects in a volute chamber 105 defined within the compressor housing 95 and is directed from the compressor housing 95 to the recuperator 50.

The compressor rotor 56 is directly coupled to the turbine rotor 57 such that the two components 56, 57 rotate in unison about the rotational axis A—A. A first high-speed bearing 110 supports the compressor end of the turbine-compressor rotor assembly 115. Thus, the turbine-compressor rotor assembly 115 is supported in a cantilever fashion with all of its support points being on the air inlet side (i.e., adjacent the inlet plenum 100) of the compressor 45. This arrangement supports the rotors 56, 57 for rotation without subjecting the first high-speed bearing 10 (or any other bearings) to the high operating temperatures associated with the turbine 35.

While many different types of bearing can be used (e.g., roller, ball, needle, journal, and the like), angular contact bearings are preferred. Angular contact bearings support the rotors 56, 57 for rotation, while simultaneously carrying the thrust load produced by the engine 10. Thus, the need for an independent thrust bearing is avoided. In addition, angular contact bearings provide increased efficiency over many other types of bearings.

Figure 4:
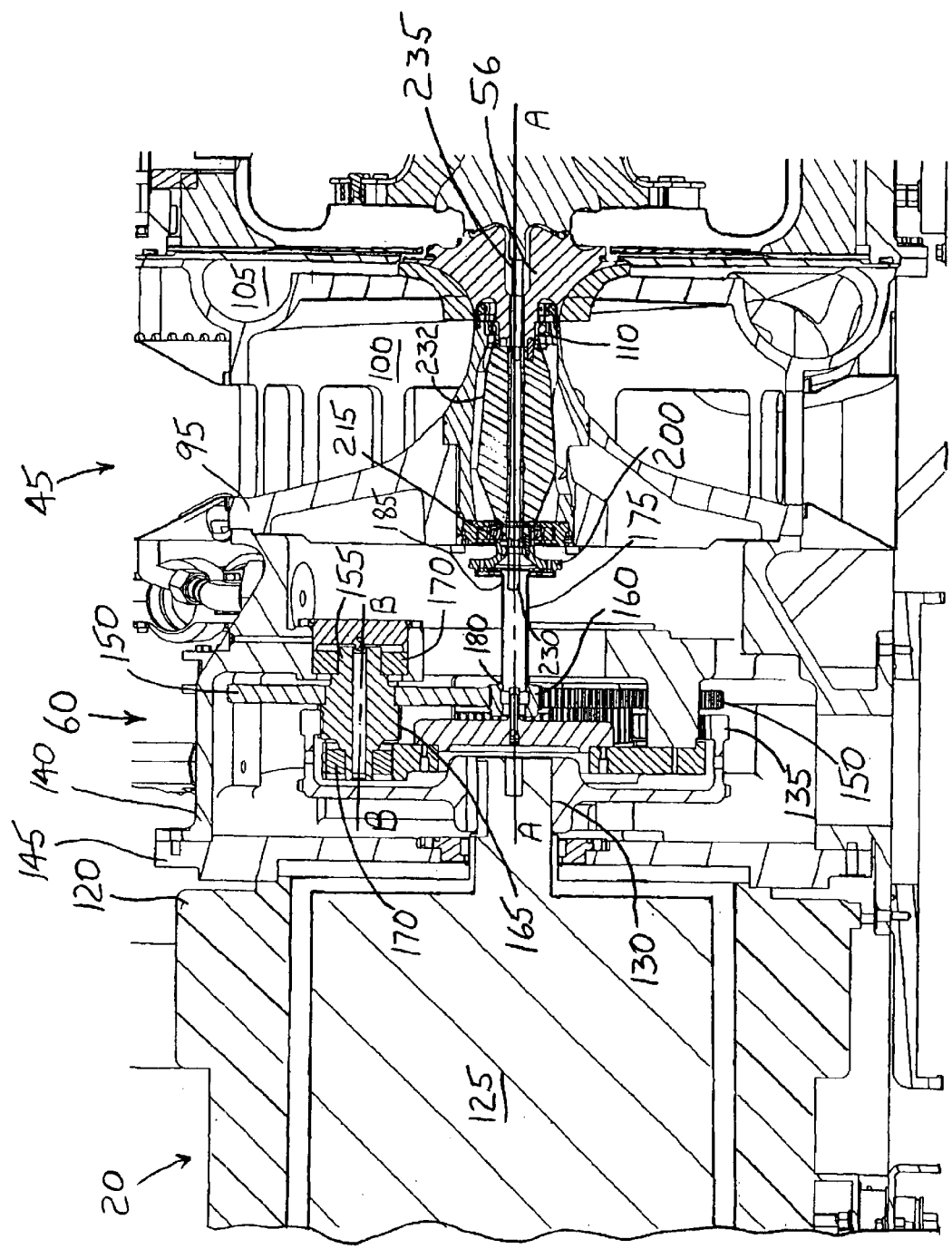
FIG. 4 is an enlarged view of the gearbox portion of the engine of FIG. 1.

The generator 20, also shown in FIG. 2, includes a generator housing 120 that contains a stator and a generator rotor 125 (shown in FIG. 4). The rotor 125 is supported for rotation by two low-speed bearings (not shown) located within the generator housing 120 and positioned at either end of the rotor 125. The generator rotor 125 includes a shaft 130 that extends out of the generator housing 120 and supports a ring gear 135. While a synchronous generator that operates at 3600 RPM or 1800 RPM to output 60 Hz is preferred, other types of generators will also function with the invention. For example, a synchronous generator that operates at 3000 RPM or 1500 RPM to output 50 Hz will also work with the present invention. In addition, asynchronous or high-speed generators (alternators) can also be driven by the present invention. These generators may operate at 4,000 RPM or higher in some cases. Furthermore, components other than generators (e.g., pumps, compressors, conveyors, and the like) can also be driven by the present invention. Some of these components may operate in excess of 15,000 RPM.

The gearbox 60 is positioned between the compressor 45 and the generator 20 and includes a gearbox housing 140 and a plurality of gears. The gearbox housing 140 attaches to the compressor housing 95 to align the components 95, 140 and maintain their positions relative to one another. The generator housing 120 also attaches to the gearbox housing 140 to fix the positions of the stationary components of the engine 10 relative to one another. With all of the housings 65, 95, 120, 140 attached, a relatively rigid structural backbone is established that supports the rotating components 56, 57, 125 in their desired locations. The relatively rigid housings 65, 95, 120, 140 also reduces undesirable movement between components and/or vibration during engine operation.

The gearbox housing 140 includes an adapter plate 145 that facilitates the attachment of the generator housing 120 and the gearbox housing 140. The adapter plate 145 directly attaches to both the gearbox housing 140 and the generator housing 120. The use of the adapter plate 145 allows for the use of a standard gearbox housing 140 with multiple generators 20 or other components. For example, engines 10 of various sizes can use the same gearbox housing 140 with different adapter plates and generators. Similarly, different speed engines (e.g., 60 Hz vs. 50 Hz) can use the same gearbox housing 140 with different rotating components and generators. Furthermore, with a new adapter plate, a standard gearbox housing 140 can be mated to a pump or compressor.

The gearbox 60, shown in FIG. 4, includes a plurality of gears that are sized and arranged to step down a high input speed (e.g., 40,000 RPM or higher) to a low output speed (e.g., 15,000 RPM or lower to drive pumps or compressors and 3600 RPM or lower to drive synchronous generators). The gearbox 60 includes three planetary gears 150, each supported by a planetary shaft 155 for rotation about a planetary axis B—B. The planetary axes B—B are spaced about 120 degrees apart around the rotational axis A—A and are spaced a parallel distance from the rotational axis A—A, thereby allowing a pinion gear 160 to engage all three planetary gears 150 simultaneously. Each planetary shaft 155 supports a drive gear 165 and is supported for rotation by two bearings 170.

Each of the drive gears 165 is sized and positioned to engage the ring gear 135 and drive the generator rotor 125. As illustrated in FIG. 4, the drive gears 165 are formed as part of the planetary shafts 155. In other constructions, separate gears 165 attach to the shafts 155 in a known manner (e.g., pinned, shrunk on, welded, bolted, and the like).

The gear ratio between the pinion gear 160 and each of the planetary gears 150 allows for the use of relatively low-speed bearings 170 (e.g., about 9,000 RPM) rather than high-speed bearings (e.g., 10,000 RPM or higher). In addition, the size of the drive gears 165 and the ring gear 135 are chosen to assure that the generator rotor 125 operates at the proper speed when the turbine-compressor shaft assembly rotates at its operating speed.

A quill shaft 175, shown in FIGS. 4–6, extends from the gearbox 60 and forms at least a portion of the connection between the turbine-compressor rotor assembly 115 and the gearbox 60. The quill shaft 175 is a substantially hollow member having a pinion end 180 and a diaphragm end 185. The pinion gear 160 is positioned at the pinion end 180 of the quill shaft 175. In most constructions, the pinion gear 160 is formed as part of the quill shaft 175. However, other constructions include a pinion gear 160 that is attached to the quill shaft 175 (e.g., shrunk-on, pinned, screwed, welded, and the like). The pinion gear 160 and the pinion end 180 of the quill shaft 175 are supported for rotation by the three planetary gears 150. As such, no additional high-speed bearing is needed to support the pinion end 180 of the quill shaft 175.

The diaphragm end 185 includes a diaphragm portion 190 that forms an attachment surface 195. The attachment surface 195 facilitates the attachment of the quill shaft 175 to a rotor flange 200.

The rotor flange 200 includes a planar surface 205 that engages the diaphragm 190 and a central bore that includes a tapered surface 210. A second high-speed bearing 215 supports the rotor flange 200 for high-speed rotation. The various rotating components (i.e., turbine rotor 57, compressor rotor 56, rotor flange 200) at least partially define a rotor train that is supported by the first and second high-speed bearings 110, 215. The bearings 110, 215 are positioned to define a space between the bearings 110, 215 and a space beyond the bearings 110, 215. A portion of the rotor train is positioned within the space between the bearings 110, 215 and a portion is disposed in the space beyond the bearings 10, 215. In the illustrated construction, a portion of the compressor rotor 56 and the entire turbine rotor 57 are disposed in the space beyond the bearings 110, 215. As such, the compressor rotor 56 and the turbine rotor 57 are supported in a cantilever fashion with the turbine rotor 57 defining a free end 57a.

The rotor flange also defines a catcher 216 that includes a first diameter bore 217 and a second diameter bore 218. The first diameter bore 217 is disposed adjacent the planar surface 205 and is sized to snuggly receive the diaphragm 190. Thus, the first diameter acts as a guide to assure that the quill shaft 175 is aligned with the rotor flange 200. The second diameter bore 218 is positioned adjacent the first diameter bore 217 and extends for the remaining length of the catcher 216. The second diameter bore 218 is also larger than the first diameter bore 217.

To connect the diaphragm 190 to the rotor flange 200, a plurality of coupling members, such as bolts 220 and shear pins 225, extend between the diaphragm 190 and the flange 200 to allow for the transmission of torque therebetween. The bolts 220 and shear pins 225 are sized to transmit torque generated by the turbine rotor 57 to the generator rotor 125. To protect the engine 10 from damage caused by high-torque transients that may periodically arise, the pins 225 and bolts 220 are sized to fail at a predetermined torque level. Thus, if the torque between the quill shaft 175 and the compressor shaft 56 exceeds that predetermined level, the bolts 220 and pins 225 will fail in shear. Generally, following the shear failure of the bolts 220 and pins 225 the quill shaft 175 moves axially away from the rotor shaft 232. The gearbox housing 140 limits the extent of this axial movement such that the diaphragm 190 remains within the axial extent of the catcher 216. The second diameter bore 218 acts as a guide to the diaphragm 190 as the two separated portions of the rotor train decelerate at different rates. Thus, the second diameter bore 218 substantially maintains the alignment of the quill shaft 175 as it decelerates.

The diaphragm 190 is flexible enough to allow slight misalignments between the rotor assembly 115 and the planetary gears 150 (i.e., angular misalignment) as well as slight axial displacements of the rotor flange 200 relative to the quill shaft 175. In addition, the ability of the diaphragm 190 to flex allows the arrangement to tune the vibrations transmitted by the turbine-compressor rotor assembly 115 or the gearbox 160.

A tie-bolt 230 extends through the rotor flange 200, a rotor shaft 232, and the compressor rotor 56 to the turbine rotor 57. A first end 235 of the tie-bolt 230 engages the turbine rotor 57 (e.g., threads, pins, shrink-fit, and the like) or an intermediate component such as a threaded sleeve. A second end 240 of the tie-bolt 230, shown in FIG. 5, includes a threaded portion 245 that extends beyond the tapered surface 210 disposed within the rotor flange 200. The rotor shaft fits between the compressor rotor and the rotor flange. A tapered nut 250 engages the threaded portion 245 and the tapered surface 210 within the rotor flange 200 to lock the rotor flange 200, the rotor shaft 232, the compressor rotor 56, and the turbine rotor 57 for rotation, while pretensioning the tie-bolt 230. The pretensioning of the tie bolt 230 applies a compressive force to the rotor flange 200, the rotor shaft 232, and the compressor rotor 56. It should be noted that the tie-bolt arrangement described herein is but one way of coupling the rotating elements (i.e., turbine rotor 57, compressor rotor 56, rotor shaft 232, rotor flange 200) that define the rotor train. One of ordinary skill will realize that there are many other methods available to couple the rotating elements to one another. As such, the invention should not be limited to the tie-bolt arrangement just described.

In operation, the turbine-compressor rotor assembly 115 rotates at a high speed (e.g., typically in excess of 40,000 RPM). The quill shaft 175 also rotates at a high speed. The high-speed components are coupled to one another via the tie-bolt 230 and are completely supported for rotation by two high-speed bearings 10, 215 and the planetary gears 150 of the gearbox 60.

The rotating quill shaft 175 drives the pinion gear 160, which engages and drives the planetary gears 150. The planetary gears 150 are sized relative to the pinion gear 160 to achieve a rotational speed that is low enough to allow for the use of low-speed bearings 170 to support the planetary gears 150. In preferred constructions, the planetary gears 150 rotate at about 9,000 RPM with slower or higher speeds being possible. By properly sizing the gears 150, 160, the need for additional high-speed bearings in the gearbox 60 can be avoided. High-speed bearings are susceptible to wear and have a higher instance of failure due to the significantly increased stress levels under which they operate. In addition, high-speed bearings are much more sensitive to vibration and imbalance issues than are their low-speed counterparts. As such, it is desirable to avoid the use of high-speed bearings where possible.

The drive gears 165 rotate with the planetary gears 150 and drive the ring gear 135 that is attached to the generator rotor 125. The ring gear 135 is sized to rotate at the desired low speed (e.g., typically 3600 RPM or 1800 RPM for 60 Hz generators and 3000 RPM or 1500 RPM for 50 Hz generators) when the turbine-compressor rotor assembly 115 is rotating at the high speed. The ring gear 135 and the generator rotor 125 are supported for rotation by low-speed bearings. Thus, as one of ordinary skill will realize, the present arrangement allows for the support and rotation of several high-speed and low-speed components using only two high-speed bearings 110, 215. The close coupling of the engine, the generator, and the gearbox allows the bearings 10, 215 to support various other high-speed components.

Although the invention has been described in detail with reference to certain preferred embodiments, variations and modifications exist within the scope and spirit of the invention as described and defined in the following claims.

What is claimed is:

1. A microturbine engine comprising:
   a turbine including a first housing and a first rotor;
   a generator including a second housing and a generator rotor, the generator rotor supported for low-speed rotation by a low-speed bearing;
   a gearbox including a third housing connected to the first housing and the second housing, a pinion gear, and a low-speed gear connected to the generator rotor and at least partially supported by the low-speed bearing;
   a shaft connected to the first rotor and the pinion gear; and
   a first high-speed bearing and a second high-speed bearing positioned to support the first rotor and the shaft for high-speed rotation, wherein the first high-speed bearing and the second high-speed bearing directly support the first rotor and no bearing directly supports the shaft.

2. The microturbine engine of claim 1, wherein the turbine includes a compressor having a compressor housing connected to the first housing and a compressor rotor connected to the first rotor.

3. The microturbine engine of claim 1, wherein the generator is a synchronous generator.

4. The microturbine engine of claim 1, wherein the first rotor rotates at a speed of at least about 15,000 RPM and the generator rotor rotates at a speed of less than about 4,000 RPM.

5. The microturbine engine of claim 1, wherein the low-speed gear is a ring gear.

6. The microturbine engine of claim 5, wherein the high-speed gear drives a plurality of planetary gears, and each of the planetary gears drives a drive gear, and the drive gears drive the ring gear.

7. The microturbine engine of claim 6, wherein each of the planetary gears is supported for rotation about a planetary axis.

8. The microturbine engine of claim 6, wherein the planetary gears support the pinion gear for rotation such that the shaft is completely supported by the planetary gears and the pair of high-speed bearings.

9. The microturbine engine of claim 1, wherein the shaft is a quill shaft.

10. The microturbine engine of claim 1, wherein the first rotor includes a turbine shaft, a compressor shaft, and a rotor flange, and wherein a tie-bolt passes through at least a portion of the rotor flange, at least a portion of the turbine shaft, and the entire compressor shaft and engages at the turbine shaft and the rotor flange to couple the turbine shaft, the compressor shaft and the rotor flange for high-speed rotation.

11. A microturbine engine comprising:
a turbine including a first housing and a first rotor;
a generator including a second housing and a generator rotor, the generator rotor supported for low-speed rotation by a low-speed bearing;
a gearbox including a third housing connected to the first housing and the second housing, a pinion gear, and a low-speed gear connected to the generator rotor and at least partially supported by the low-speed bearing;
a shaft connected to the first rotor and the pinion gear; and
a first high-speed bearing and a second high-speed bearing positioned to support the first rotor and the shaft for high-speed rotation, wherein the shaft is a quill shaft, and wherein the quill shaft includes a diaphragm portion that allows for relative movement between the first rotor and the pinion gear.

12. The microturbine engine of claim 11, wherein the relative movement is limited to angular misalignment and axial displacement.

13. A microturbine engine comprising:
a turbine including a first housing and a first rotor;
a generator including a second housing and a generator rotor, the generator rotor supported for low-speed rotation by a low-speed bearing;
a gearbox including a third housing connected to the first housing and the second housing, a pinion gear, and a low-speed gear connected to the generator rotor and at least partially supported by the low-speed bearing;
a shaft connected to the first rotor and the pinion gear;
a first high-speed bearing and a second high-speed bearing positioned to support the first rotor and the shaft for high-speed rotation; and
a plurality of coupling members coupling the shaft to the first rotor, the coupling members sized to shear when a torque level generated by engine operation exceeds a predetermined value.

14. The microturbine engine of claim 13, wherein the first rotor includes a catcher having a first diameter portion and a second diameter portion.

15. The microturbine engine of claim 14, wherein the first diameter portion is sized to receive the shaft during engine operation and the second diameter portion is sized to guide the shaft when the coupling members shear.

16. The microturbine engine of claim 13, wherein the coupling members include a combination of at least one bolt and at least one shear pin.

17. A microturbine engine comprising:
a turbine including a turbine housing and a turbine rotor;
a compressor including a compressor housing coupled to the turbine housing and a compressor rotor coupled to the turbine rotor;
a rotor flange coupled to the compressor rotor such that the turbine rotor, the compressor rotor, and the rotor flange at least partially define a rotor train;
a first high-speed bearing and a second high-speed bearing coupled to the rotor train and at least partially supporting the rotor train for rotation, the first high-speed bearing and the second high-speed bearing positioned to define a space between the bearings and a space that extends beyond the bearings, at least a portion of the rotor train positioned within the space beyond the bearings to define a cantilever portion having a free end;
a synchronous generator including a generator housing and a generator rotor, the generator rotor supported for low-speed rotation by at least one low-speed bearing;
a gearbox including a gearbox housing connected to the compressor housing and the generator housing, the gearbox including a ring gear connected to the generator rotor, a plurality of planetary gears, and a pinion gear positioned to engage each of the planetary gears; and
a quill shaft coupled to the rotor train and the pinion gear such that the quill shaft is fully supported by the second high-speed bearing and the planetary gears, the quill shaft disposed in the space beyond the bearings such that it is not directly supported by a bearing.

18. The microturbine engine of claim 17, wherein the turbine rotor rotates at a speed of at least about 15,000 RPM and the generator rotor rotates at a speed of less than about 4,000 RPM.

19. The microturbine engine of claim 17, wherein the pinion gear drives each of the planetary gears, each of the planetary gears drives a drive gear, and the drive gears drive the ring gear.

20. The microturbine engine of claim 17, wherein each of the planetary gears is supported for rotation about a planetary axis.

21. The microturbine engine of claim 17, wherein a tie-bolt passes through at least a portion of the rotor flange, at least a portion of the turbine rotor, and the entire compressor rotor and engages the turbine rotor and the rotor flange to couple the turbine rotor, the compressor rotor and the rotor flange for high-speed rotation.

22. The microturbine engine of claim 17, wherein at least a portion of the compressor rotor and the entire turbine rotor are supported in the space beyond the bearings to at least partially define the cantilever portion.

23. The microturbine engine of claim 17, wherein the turbine rotor includes a free end.

24. A microturbine engine comprising:
a turbine including a turbine housing and a turbine rotor;
a compressor including a compressor housing coupled to the turbine housing and a compressor rotor coupled to the turbine rotor;
a rotor flange coupled to the compressor rotor such that the turbine rotor, the compressor rotor, and the rotor flange at least partially define a rotor train;
a first high-speed bearing and a second high-speed bearing coupled to the rotor train and at least partially supporting the rotor train for rotation, the first high-speed bearing and the second high-speed bearing, positioned to define a space between the bearings and a space that extends beyond the bearings, at least a portion of the rotor train positioned within the space beyond the bearings to define a cantilever portion having a free end;
a synchronous generator including a generator housing and a generator rotor, the generator rotor supported for low-speed rotation by at least one low-speed bearing;
a gearbox including a gearbox housing connected to the compressor housing and the generator housing, the gearbox including a ring gear connected to the generator rotor, a plurality of planetary gears, and a pinion gear positioned to engage each of the planetary gears; and
a quill shaft coupled to the rotor train and the pinion gear such that the quill shaft is fully supported by the second high-speed bearing and the planetary gears, wherein the quill shaft includes a diaphragm portion that allows for relative movement between the turbine rotor and the pinion gear.

25. The microturbine engine of claim 24, wherein the relative movement is limited to angular misalignment and axial displacement.

26. A microturbine engine comprising:
- a turbine including a turbine housing and a turbine rotor;
- a compressor including a compressor housing coupled to the turbine housing and a compressor rotor coupled to the turbine rotor;
- a rotor flange coupled to the compressor rotor such that the turbine rotor, the compressor rotor, and the rotor flange at least partially define a rotor train;
- a first high-speed bearing and a second high-speed bearing coupled to the rotor train and at least partially supporting the rotor train for rotation, the first high-speed bearing and the second high-speed bearing positioned to define a space between the bearings and a space that extends beyond the bearings, at least a portion of the rotor train positioned within the space beyond the bearings to define a cantilever portion having a free end;
- a synchronous generator including a generator housing and a generator rotor, the generator rotor supported for low-speed rotation by at least one low-speed bearing;
- a gearbox including a gearbox housing connected to the compressor housing and the generator housing, the gearbox including a ring gear connected to the generator rotor, a plurality of planetary gears, and a pinion gear positioned to engage each of the planetary gears;
- a quill shaft coupled to the rotor train and the pinion gear such that the quill shaft is fully supported by the second high-speed bearing and the planetary gears; and
- a plurality of coupling members positioned to couple the quill shaft to the compressor rotor, the coupling members sized to shear when a torque level generated by engine operation exceeds a predetermined value.

27. The microturbine engine of claim 26, wherein the coupling members include a combination of at least one bolt and at least one shear pin.

28. The microturbine engine of claim 26, wherein the rotor flange includes a catcher having a first diameter portion and a second diameter portion.

29. The microturbine engine of claim 28, wherein the first diameter portion is sized to receive the quill shaft during engine operation and the second diameter portion is sized to guide the quill shaft when the coupling members shear.

30. A method of coupling a rotating element of an engine that operates at a first speed to a driven component that operates at a second speed, the second speed slower than the first speed, the method comprising:
- coupling a shaft to the rotating element;
- supporting the rotating element and the shaft with a first high-speed bearing and a second high-speed bearing such that at least a portion of the rotating element is disposed in a space between the bearings and at least a portion of the rotating element and the shaft are disposed in a space beyond the bearings, the shaft not being directly supported by a bearing;
- engaging a second end of the shaft with a plurality of planetary gears;
- supporting the driven component with at least one low-speed bearing; and
- coupling a low-speed gear to the driven component, the low-speed gear coupled to each of the planetary gears.

31. The method of claim 30, wherein the rotating element includes a turbine rotor, a compressor rotor, and a rotor flange.

32. The method of claim 31, further comprising passing a tie-bolt at least partially through the rotor flange and the turbine rotor and completely through the generator rotor.

33. The method of claim 32, further comprising tightening the tie-bolt to lock the compressor rotor, the turbine rotor and the rotor flange relative to one another.

34. The method of claim 30, wherein the driven component is a synchronous generator.

35. The method of claim 30, wherein the first speed is in excess of about 15,000 RPM and the second speed is less than about 4,000 RPM.

36. A method of coupling a rotating element of an engine that operates at a first speed to a driven component that operates at a second speed, the second speed slower than the first speed, the method comprising:
- coupling a shaft to the rotating element;
- supporting the rotating element and the shaft with a first high-speed bearing and a second high-speed bearing such that at least a portion of the rotating element is disposed in a space between the bearings and at least a portion of the rotating element is disposed in a space beyond the bearings;
- engaging a second end of the shaft with a plurality of planetary gears;
- supporting the driven component with at least one low-speed bearing; and
- coupling a low-speed gear to the driven component, the low-speed gear coupled to each of the planetary gears, wherein the rotating element includes a turbine rotor, a compressor rotor, and a rotor flange, and wherein the coupling step further comprises attaching a flexible diaphragm to the rotor flange.

37. The method of claim 36, further comprising allowing angular misalignment between the shaft and the rotor flange by flexing the diaphragm.

38. The method of claim 36, wherein the attaching step further comprises engaging a plurality of coupling members with the rotor flange and the diaphragm.

39. The method of claim 38, wherein the coupling members include at least one bolt and at least one shear pin.

40. The method of claim 38, further comprising shearing the coupling members in response to torque level generated by the turbine rotor in excess of a predetermined torque level.

41. The method of claim 40, further comprising providing a catcher formed as part of the rotor flange operable to support the shaft following the shearing of the coupling members.

* * * * *